United States Patent
Kim et al.

(10) Patent No.: US 9,407,821 B2
(45) Date of Patent: Aug. 2, 2016

(54) ELECTRONIC APPARATUS AND METHOD OF CONTROLLING THE SAME

(71) Applicant: SAMSUNG ELECTRONICS CO., LTD., Suwon-si, Gyeonggi-do (KR)

(72) Inventors: Byoung-woo Kim, Seoul (KR); Yun-ki Jeong, Suwon-si (KR); Kyoung-min Park, Bucheon-si (KR); Jae-heung Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 14/184,946

(22) Filed: Feb. 20, 2014

(65) Prior Publication Data

US 2015/0049207 A1    Feb. 19, 2015

(30) Foreign Application Priority Data

Aug. 14, 2013 (KR) ........................ 10-2013-0096873

(51) Int. Cl.
  *H04N 5/232* (2006.01)
(52) U.S. Cl.
  CPC ........... *H04N 5/23245* (2013.01); *H04N 5/232* (2013.01)
(58) Field of Classification Search
  CPC ............ H04N 5/23245; G06F 11/1417; G06F 2009/3883; G06F 2211/1097; G06F 9/3877; G06F 9/4403; G06F 9/4405; G06F 9/4418
  USPC ................. 348/207.1, 207.11, 207.99, 222.1, 348/231.1, 231.2, 231.99, 552
  See application file for complete search history.

(56) References Cited

U.S. PATENT DOCUMENTS

| | | | |
|---|---|---|---|
| 7,900,035 B2 * | 3/2011 | Yoshida ................ | G06F 9/4405 713/1 |
| 2008/0231724 A1 | 9/2008 | Wang | |
| 2010/0149370 A1 | 6/2010 | Kim | |
| 2010/0245605 A1 | 9/2010 | Sakurai | |
| 2012/0147220 A1 | 6/2012 | Lee | |

FOREIGN PATENT DOCUMENTS

| | | |
|---|---|---|
| JP | 2010-166607 A | 7/2010 |
| KR | 10-0655054 B1 | 12/2006 |

OTHER PUBLICATIONS

PCT Search Report and Written Opinion issued for PCT/KR2014/006803 (Nov. 7, 2014).

* cited by examiner

*Primary Examiner* — Lin Ye
*Assistant Examiner* — Chriss Yoder, III
(74) *Attorney, Agent, or Firm* — Drinker Biddle & Reath LLP

(57) ABSTRACT

An electronic apparatus includes a main processor, a first memory connected to the main processor, an image processor that controls a photographing operation in response to a control signal from the main processor, and a second memory connected to the image processor. If the main processor is completely booted up after the image processor is completely booted up, the image processor controls the photographing operation in response to a shutter release signal, and stores an image captured according to the photographing operation in the second memory. The method includes determining whether the main processor is completely booted up, if the image processor is completely booted up; if the main processor is not completely booted up, controlling a photographing operation, by the image processor, in response to a shutter release signal; and storing an image captured according to the photographing operation, in a memory of the image processor.

20 Claims, 7 Drawing Sheets

ELECTRONIC APPARATUS AND METHOD OF CONTROLLING THE SAME

CROSS-REFERENCE TO RELATED PATENT APPLICATION

This application claims the priority benefit of Korean Patent Application No. 10-2013-0096873, filed on Aug. 14, 2013, in the Korean Intellectual Property Office, the disclosure of which is incorporated herein in its entirety by reference.

BACKGROUND

1. Field

One or more embodiments relate to an electronic apparatus (e.g., a photographing apparatus) and a method of controlling the same.

2. Description of the Related Art

A typical method of measuring the performance of a camera device includes a method of measuring a preparation time it takes for a photographing operation to be ready after the camera device is booted up. In an existing photographing device including a main processor and an image processor, since a photographing operation is enabled after the main processor is completely booted up, a low performance is obtained in relation to the above preparation time.

For example, a smartphone and an android camera may execute a camera application so as to perform a photographing operation after a time equal to or longer than about 10 seconds is passed for cold booting.

SUMMARY

One or more embodiments include an electronic apparatus capable of rapidly performing a photographing operation before a main processor is completely booted up, and a method of controlling the same.

Additional aspects will be set forth in part in the description which follows and, in part, will be apparent from the description, or may be learned by practice of the presented embodiments.

According to one or more embodiments, a method of controlling an electronic apparatus including a main processor and an image processor, includes: if the image processor is completely booted up, determining whether the main processor is completely booted up; if the main processor is not completely booted up, controlling a photographing operation of the electronic apparatus, by the image processor, in response to a shutter release signal; and storing an image captured according to the photographing operation, in a memory of the image processor.

If the main processor is completely booted up, the main processor may control the image processor to control the photographing operation.

The method may further include, if the main processor is completely booted up, transmitting the captured image stored in the memory of the image processor, to the main processor.

The captured image may be compressed, and the image processor may transmit the compressed image to the main processor.

The main processor may receive the transmitted compressed image, generate a compressed image file, and store the compressed image file in a memory of the main processor or an external memory.

If the main processor is completely booted up, the main processor may execute a program for the photographing operation.

The controlling of the photographing operation may include: displaying a live-view image and a setting menu; setting a photographing control parameter of an input image in response to the shutter release signal; capturing the input image according to the set photographing control parameter; and displaying the captured image.

The method may further include: selecting one of a first image output from the image processor and a second image output from the main processor; and displaying the selected image.

The image may be selected according to a selection control signal of the image processor or a selection control signal of the main processor.

The method may further include determining whether a size of a storage space of the memory is equal to or greater than a threshold value. If the size of the storage space of the memory is equal to or greater than the threshold value, then the image processor may control the photographing operation of the electronic apparatus.

The method may further include, if the size of the storage space of the memory is less than the threshold value, outputting a message informing that the memory is out of storage space.

The main processor may be an application processor.

According to one or more embodiments, an electronic apparatus includes: a main processor; a first memory connected to the main processor; an image processor that controls a photographing operation in response to a control signal from the main processor; and a second memory connected to the image processor. If the main processor is completely booted up after the image processor is completely booted up, the image processor controls the photographing operation in response to a shutter release signal, and stores an image captured according to the photographing operation in the second memory.

If the main processor is completely booted up, the image processor may transmit the captured image stored in the second memory to the main processor.

The image processor may include: a booting management unit that, if the image processor is completely booted up, determines whether the main processor is completely booted up; a photographing control unit that, if the main processor is not completely booted up, controls the photographing operation of the electronic apparatus in response to the shutter release signal; and a memory management unit that stores an image captured according to the photographing operation, in the second memory.

The memory management unit may determine whether a size of a storage space of the second memory is equal to or greater than a threshold value. If the size of the storage space of the memory is equal to or greater than the threshold value, the photographing control unit may control the photographing operation.

The electronic apparatus may further include: a selection unit that selects one of a first image output from the image processor and a second image output from the main processor; and a display unit that displays the image selected by the selection unit.

The selection unit may select the image according to a selection control signal of the image processor or a selection control signal of the main processor.

If the main processor is completely booted up, the main processor may control the image processor to control the photographing operation.

If the main processor is completely booted up, the main processor may execute a program for the photographing operation.

The main processor may be an application processor.

According to one or more embodiments, a non-transitory computer-readable recording medium having recorded thereon a computer program for executing the method described above is included.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
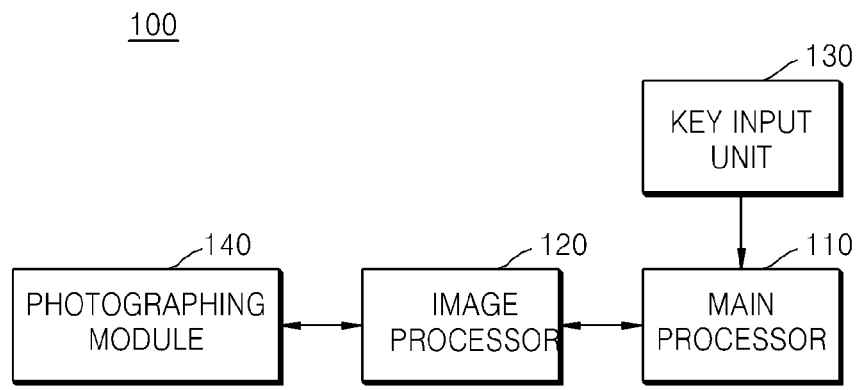
FIG. 1 is a block diagram illustrating a photographing apparatus according to related art.

While exemplary embodiments of the invention may be modified and exhibit alternative forms, specific embodiments thereof are shown by way of example in the drawings and will herein be described in detail. It should be understood, however, that there the invention is not limit to exemplary embodiments and/or the particular forms disclosed. Exemplary embodiments of the invention are to cover all modifications, equivalents, and alternatives falling within the spirit and scope of the invention. In the following description, a detailed description of known functions and configurations incorporated herein will be omitted when it may make the subject matter unclear.

It will be understood that, although the terms "first", "second", etc. may be used herein to describe various elements, these elements should not be limited by these terms. These terms are only used to distinguish one element from another.

The terminology used herein is for the purpose of describing particular embodiments only and is not intended to be limiting of exemplary embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Hereinafter, the embodiments will be described in detail with reference to the attached drawings. Like reference numerals in the drawings denote like elements and thus repeated descriptions will be omitted.

FIG. 1 is a block diagram illustrating a photographing apparatus 100 according to related art.

Referring to FIG. 1, the photographing apparatus 100 includes a main processor 110, an image processor 120, a photographing module 140 connected to the image processor 120, and a key input unit 130 connected to the main processor 110. Here, the photographing apparatus 100 is driven by two separate processors, i.e., the main processor 110 and the image processor 120. The main processor 110 may be an application processor, and performs a photographing operation by controlling the image processor 120. Here, although the main processor 110 and the image processor 120 are illustrated, the photographing apparatus 100 is not limited thereto, and may be driven by any other two separate processor chips.

The photographing apparatus 100 may perform a camera function (a photographing operation), and may drive various applications (for example, voice/video call, the Internet, and multimedia applications). The main processor 110 controls the camera function and the driving of various applications. The main processor 110 controls the image processor 120 by receiving a photographing signal, for example, a shutter release signal, input via the key input unit 130. The image processor 120 captures input images by driving the photographing module 140, performs predetermined image processing on the captured images, and transmits resultant images (for example, RGB data, YUV data, or JPEG data) to the main processor 110. The main processor 110 receives and stores the transmitted images in an embedded memory or an external memory.

In the above-described photographing apparatus 100, since the main processor 110 and the image processor 120 have a master-slave relationship, after the photographing apparatus 100 is powered on, the main processor 110 should be completely booted up before a photographing operation is performed. For example, a smartphone or an android camera may execute a camera application to perform a photographing operation after a time equal to or longer than 10 seconds has passed for cold booting (of an application processor). Accordingly, even when an image processor having a short booting time (for example, 1 to 2 seconds) is completely booted up earlier than an application processor, the photographing operation cannot be performed until the application processor is completely booted up.

According to an embodiment, a photographing operation may be performed before an application is completely booted up. If a photographing input of a user is received before the application is completely booted up, images are captured by driving only an image processor. The image processor stores the captured images within a range of the capacity of a memory of the image processor or an on-chip memory, and sequentially transmits the stored captured images to an application processor if the application is completely booted up. Embodiments will now be described with reference to FIGS. 2 to 5.

Figure 2:
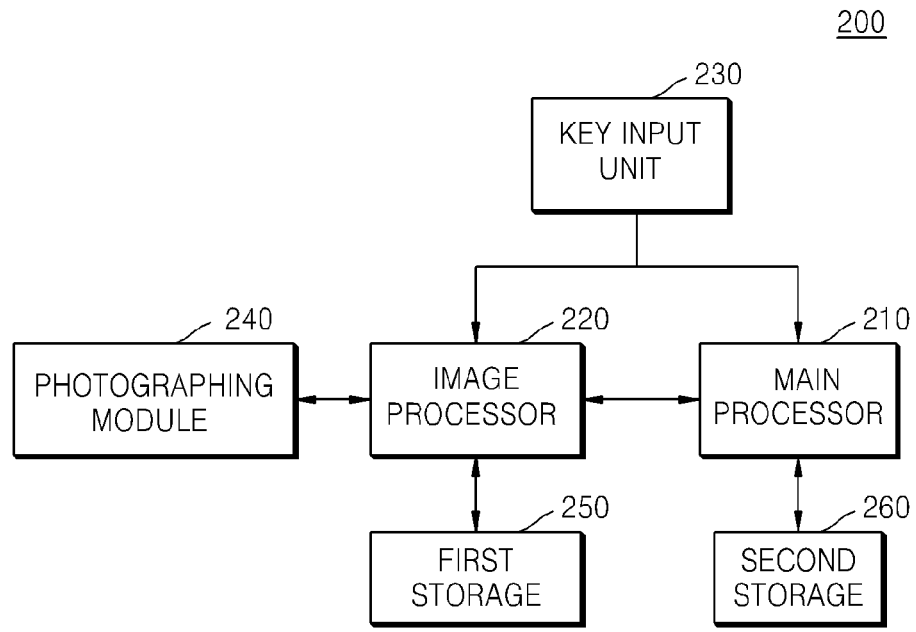
FIG. 2 is a block diagram illustrating an electronic apparatus, according to an embodiment.

FIG. 2 is a block diagram illustrating an electronic apparatus (e.g., a photographing apparatus 200), according to an embodiment.

Referring to FIG. 2, the photographing apparatus 200 includes a main processor 210, an image processor 220, a key input unit 230, a photographing module 240, a first storage 250, and a second storage 260. The photographing apparatus 200 includes a photographing device having a 2-chip structure including the main processor 210 for controlling various applications and all functions including a photographing function of the photographing device, and the image processor 220 for performing the photographing function. The photographing device may be, for example, a smartphone, a digital camera, a personal digital assistant (PDA), a portable multimedia player (PMP), or any other electronic apparatuses having image capturing capabilities.

The key input unit 230 is connected to both the main processor 210 and the image processor 220. The key input unit 230 is an element for receiving a control signal input from an external environment, for example, a user. The key input unit 230 may include a shutter release button for inputting a shutter release signal for taking a photo by exposing an imaging device to light for a determined time, a power button for inputting a control signal for controlling power on or off, a wide angle-zoom button and a telephoto-zoom button for respectively increasing and reducing a viewing angle according to an input, and various function buttons for inputting text, selecting a mode such as a photographing mode or a reproduction mode, selecting a white balance setting function, and selecting an exposure setting function. Although the key input unit 230 may be formed as various buttons as described above, the key input unit 230 is not limited thereto, and may be formed in any other form for receiving inputs of a user, for example, a keyboard, a touch pad, a touchscreen, or a remote controller.

In a state when the main processor 210 is completely booted up, or in a general state, the main processor 210 receives the user input via the key input unit 230, processes the user input, and transmits the user input (for example, a photographing command according to a shutter release signal) to the image processor 220 via a communication channel connected to the image processor 220. In the photographing apparatus 200, if the main processor 210 is not completely booted up, the image processor 220 receives the user input via the key input unit 230. The user input via the key input unit 230 is received through a general purpose input/output (GPIO) port (not shown) of image processor 220. Accordingly, even before the main processor 210 is completely booted up, the user input (e.g., a shutter release signal) is received, and a photographing operation is performed.

The image processor 220 and the main processor 210 respectively include the first storage 250 and the second storage 260 as their memories. Each of the first storage 250 and the second storage 260 may be dynamic random access memory (DRAM) or a NAND flash memory, and the second storage 260 may be an embedded memory or an external memory. In a state after the main processor 210 is completely booted up, or in a normal state, the image processor 220 transmits captured or compressed images stored in the first storage 250, to the main processor 210, and the main processor 210 receives and stores the transmitted images in the second storage 260. According to an embodiment, before the main processor 210 is completely booted up, the image processor 220 captures images via the photographing module 240 according to a photographing key value (e.g., a shutter release signal) received via the key input unit 230, and stores the captured images in the first storage 250. If the main processor 210 is completely booted up, the image processor 220 sequentially transmits the captured images stored in the first storage 250, to the main processor 210. Also, if the photographing key value is received via the key input unit 230, the image processor 220 may determine whether a storage capacity of the first storage 250 is sufficient to store captured images, and may capture images via the photographing module 240 if the storage capacity is sufficient. Otherwise, if the storage capacity is not sufficient, the image processor 220 may display a message or a user interface (UI) informing that the first storage unit 250 is out of memory, to a user. If the main processor 210 is completely booted up, the main processor 210 may immediately execute programs related to a photographing operation, and may prepare a next photographing operation.

Figure 3:
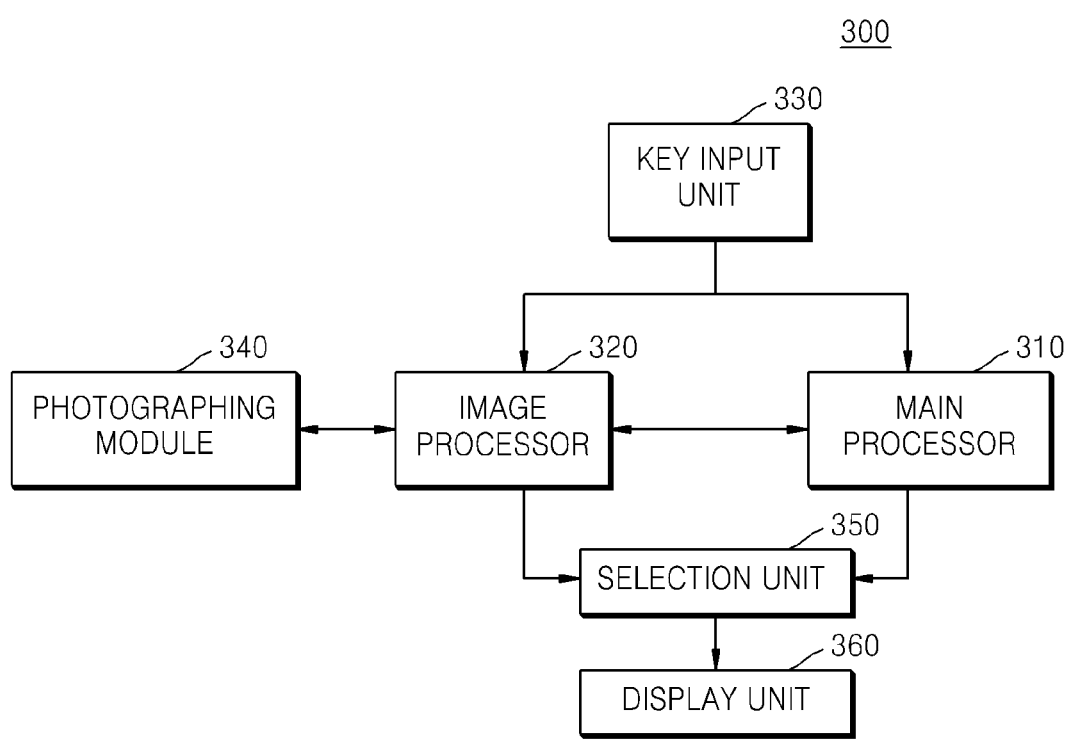
FIG. 3 is a block diagram illustrating an electronic apparatus, according to another embodiment.

FIG. 3 is a block diagram illustrating an electronic apparatus (e.g., a photographing apparatus 300), according to another embodiment.

Referring to FIG. 3, the photographing apparatus 300 includes a main processor 310, an image processor 320, a key input unit 330, a photographing module 340, a selection unit 350, and a display unit 360. Although not shown in FIG. 3, the photographing apparatus 300 may further include the first storage 250 and the second storage 260 illustrated in FIG. 2.

When the image processor 320 receives a photographing key value (e.g., a shutter release signal) via the key input unit 330, if the main processor 310 is not completely booted up, the image processor 320 prepares a photographing operation. The image processor 320 performs a photographing operation by controlling the photographing module 340. Here, the photographing operation includes output of a live-view image, setting of photographing parameters including auto focusing and exposure control parameters, control of a shutter, capturing of images, image processing on captured raw data, and output of quick-view images.

The image processor 320 outputs data for the live-view image and the quick-view images to the display unit 360. If the image processor 320 transmits a control signal (i.e., a selection control signal for outputting data provided from the image processor 320) to the selection unit 350, the selection unit 350 outputs the data that is output from the image processor 320, on the display unit 360. Like the process of outputting the live-view image, the quick-view images are output on the display unit 360 by the selection of the selection unit 350.

If the main processor 310 is completely booted up and the main processor 310 transmits a control signal (i.e., a selection control signal for outputting data provided from the main processor 310) to the selection unit 350, the selection unit 350 outputs the data that is output from the main processor 310, on the display unit 360. Here, the process of displaying images (live-view and quick-view images) captured solely by the image processor 320 before the main processor 310 is completely booted up, the process of displaying captured images stored in the image processor 320 by sequentially transmitting the images to the main processor 310 after the main processor 310 is completely booted up, and the process of displaying images captured after both the main processor 310 and the image processor 320 are completely booted up may be the same.

In the embodiment of FIG. 3, although the selection unit 350 is illustrated as a module separate from the main processor 310 and the image processor 320, the selection unit 350 is not limited thereto, and may be included in the main processor 310.

Figure 7:
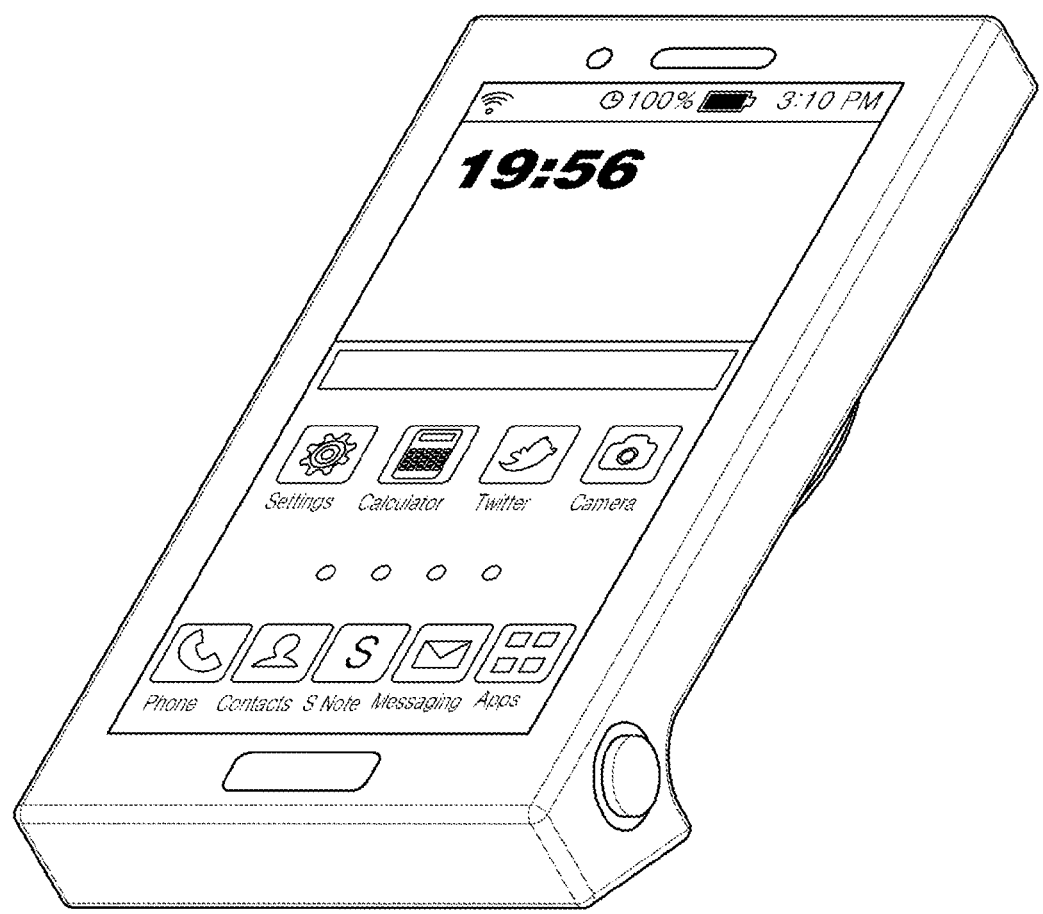
FIGS. 7 and 8 are perspective views illustrating screens of electronic apparatuses, according to various embodiments.
Figure 8:
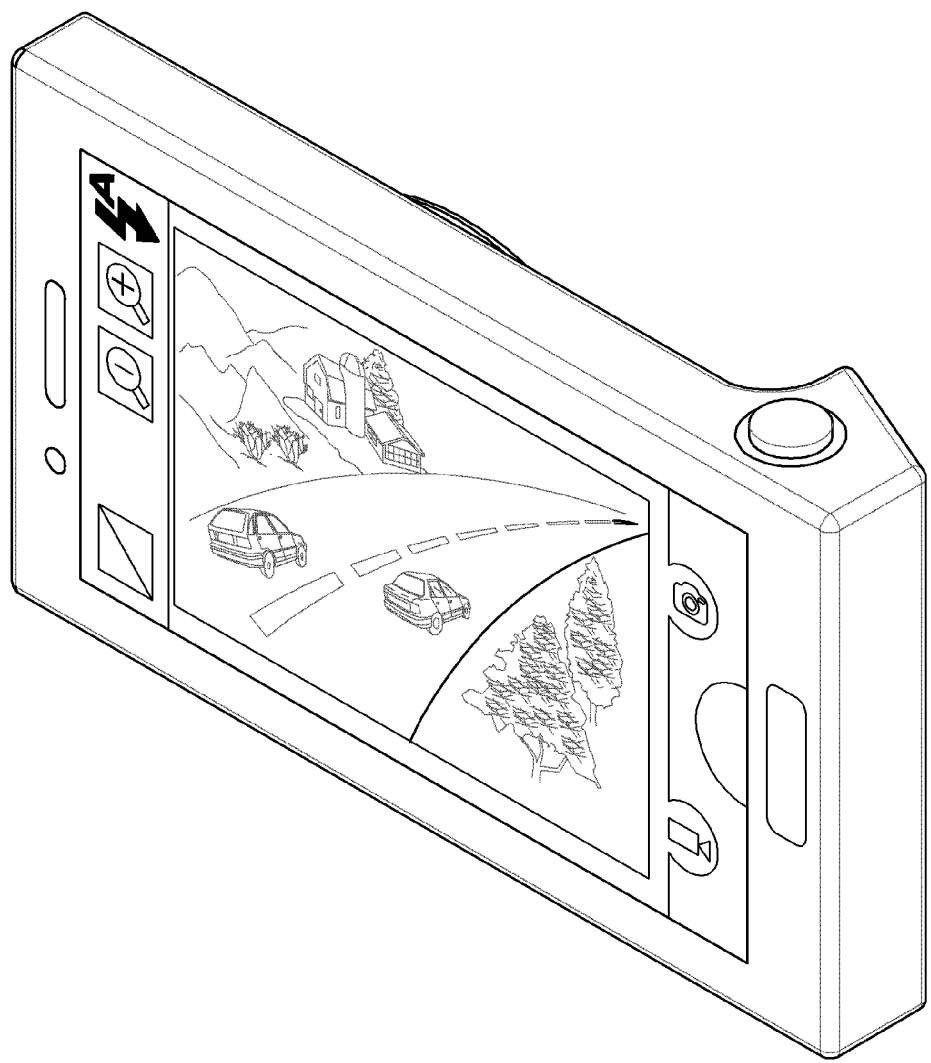

If a photographing key value (for example, a shutter release signal) is received via the key input unit 430, before the main processor 310 is completely booted up, the image processor 320 performs a photographing operation. For example, the image processor 320 may form a UI screen or a graphical user interface (GUI) for a photographing operation, which is different from a UI screen or a GUI for a general photographing operation. In general, a general photographing operation is performed by the control of the main processor 310 after the main processor 310 is completely booted up, and the main processor 310 provides a full UI. As illustrated in FIG. 7, the main processor 310 provides various application menus, controls a photographing operation via the image processor 320 if a camera application is executed, and, in this case, provides a full UI for a photographing operation. However, according to an embodiment, before the main processor 310 is completely booted up, if the image processor 320 performs a photographing operation, as illustrated in FIG. 8, a limited UI related to or capable of manipulating the key input unit 330 is provided. Accordingly, the image processor 320 may not unnecessarily waste resources for forming a full UI, and may rapidly perform a photographing operation according to a user's intention. After the main processor 310 is completely booted up, the main processor 310 may immediately execute programs required for a photographing operation, and thus may prepare the photographing operation.

Figure 4:
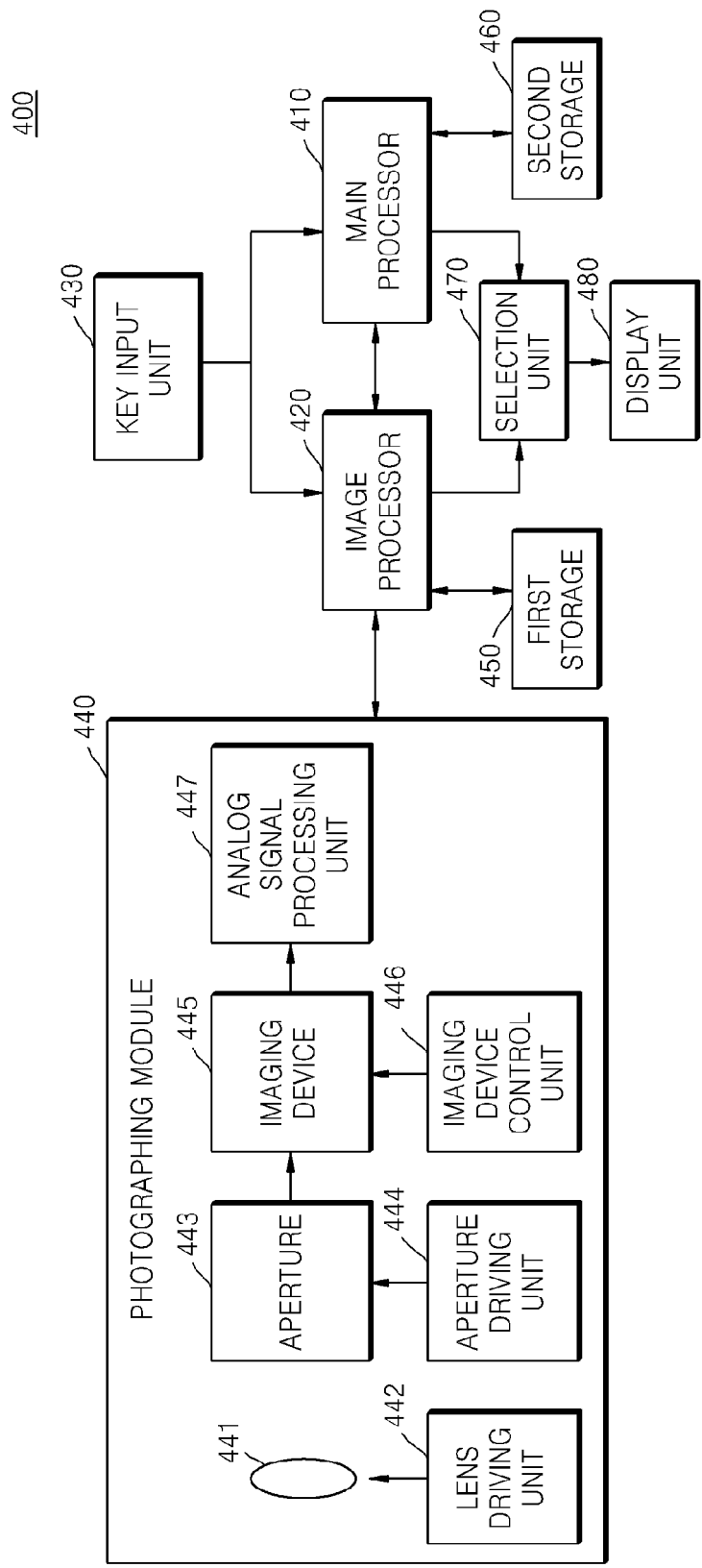
FIG. 4 is a block diagram illustrating an electronic apparatus, according to another embodiment.

FIG. 4 is a block diagram illustrating an electronic apparatus (e.g., a photographing apparatus 400), according to another embodiment.

Referring to FIG. 4, the photographing apparatus 400 includes a main processor 410, an image processor 420, a key input unit 430, a photographing module 440, a first storage 450, a second storage 460, a selection unit 470, and a display unit 480. Descriptions provided above with respect to FIGS. 2 and 3 are not provided, and the photographing module 440 is described here.

The photographing module 440 may include a lens unit 441, a lens driving unit 442, an aperture 443, an aperture driving unit 444, an imaging device 445, an imaging device control unit 446, and an analog signal processing unit 447.

The lens unit 441 focuses an optical signal. The lens unit 441 includes, for example, a zoom lens for increasing or reducing a viewing angle according to a focal length, and a focus lens for focusing on an object, and each of the zoom lens and the focus lens may include one lens or a group of a plurality of lenses. The aperture 443 controls the intensity of incident light by adjusting its degree of opening. The lens driving unit 442 and the aperture driving unit 444 respectively drive the lens unit 441 and the aperture 443 according to a control signal received from the image processor 420. The lens driving unit 442 controls a focal length by adjusting the position of a lens, and performs operations such as auto focusing, zooming, and focusing. The aperture driving unit 444 adjusts the degree of opening of the aperture 443, and performs operations such as auto focusing, automatic exposure compensation, focusing, and depth of field adjustment by particularly adjusting an f number or an aperture value.

The optical signal transmitted through the lens unit 441 reaches a light-receiving surface of the imaging device 445 so as to form an image of an object. The imaging device 445 may use, for example, a charge-coupled device (CCD), a complementary metal oxide semiconductor image sensor (CIS), or a high-speed image sensor for converting the optical signal into an electric signal. The imaging device 445 may have, for example, a sensitivity controlled by the imaging device control unit 446. The imaging device control unit 446 may control the imaging device 445 according to a control signal automatically generated due to an image signal input in real time, or a control signal manually input according to a user's manipulation. An exposure time of the imaging device 445 is adjusted by a shutter (not shown). The shutter includes a mechanical shutter for adjusting incidence of light by moving a lens shade, or an electronic shutter for controlling exposure by supplying an electric signal to the imaging device 445. The analog signal processing unit 447 performs, for example, noise reduction, gain adjustment, waveform regulation, and analog-to-digital conversion on an analog signal provided from the imaging device 445.

The key input unit 430 is an element for receiving a control signal input from an external environment, for example, a user. The key input unit 430 may include a shutter release button for inputting a shutter release signal for taking a photo by exposing the imaging device 445 to light for a determined time, a power button for inputting a control signal for controlling power on or off, a wide angle-zoom button and a telephoto-zoom button for respectively increasing and reducing a viewing angle according to an input, and various function buttons for inputting text, selecting a mode such as a photographing mode or a reproduction mode, selecting a white balance setting function, and selecting an exposure setting function.

The photographing apparatus 400 stores programs such as an operating system for driving the photographing apparatus 400, and an application system, and data required for or resulting from calculation in the second storage 460. If the main processor 410 is completely booted up, the main processor 410 executes the programs stored in the second storage 460 and required for a photographing operation. According to an embodiment, before the main processor 410 is completely booted up, the image processor 420 solely executes the programs for a photographing operation. However, if the main processor 410 is completely booted up, the main processor 410 loads and executes the programs stored in the second storage 460 and required for a photographing operation. Before the main processor 410 is completely booted up, if the image processor 420 performs a photographing operation, the programs required for a photographing operation are stored in the first storage 450. In this case, the first storage 450 may store data for providing a limited UI, and image data captured or compressed due to the photographing operation of the image processor 420.

The photographing apparatus 400 includes the display unit 480 for displaying an operation state of the photographing apparatus 400 or information about captured images. The display unit 480 may provide visual information and auditory information to a user. In order to provide visual information, the display unit 480 may be formed as, for example, a liquid crystal display (LCD) panel or an organic light-emitting display (OLED) panel. The display unit 480 displays data output from the image processor 420 or the main processor 410 according to a selection control signal of the selection unit 470.

The image processor 420 processes an input image signal, and controls the other elements according to the processed image signal or an external input signal. The image processor 420 may perform image signal processing for improving image quality, for example, noise reduction, gamma correction, color filter array interpolation, color matrix, color correction, or color enhancement, on input image data. Also, the image processor 420 may generate an image file by compressing image data generated by performing the image signal processing, or may reconstruct image data from the image file. The image data may be compressed in a reversible or irreversible format. Appropriately, the image data may be compressed in a Joint Photographic Experts Group (JPEG) format or a JPEG 2000 format. The compressed data is stored in the first storage 450. Also, the image processor 420 may functionally perform, for example, hue adjustment, blurring, edge enhancement, image analysis, image recognition, and image effects. The image recognition may include, for example, facial recognition and scene recognition. For example, brightness adjustment, color correction, contrast adjustment, edge enhancement, screen splitting, character image generation, and image combining may be performed.

Also, the image processor 420 may execute a program stored in a program storage (not shown), may include a separate module so as to generate control signals for controlling, for example, auto focusing, zooming, focusing, and automatic exposure compensation, and to provide the control signals to the lens driving unit 442, the aperture driving unit 444, and the imaging device control unit 446, and may control operations of all elements included in the photographing module 440, for example, a shutter and a flash.

Figure 5:
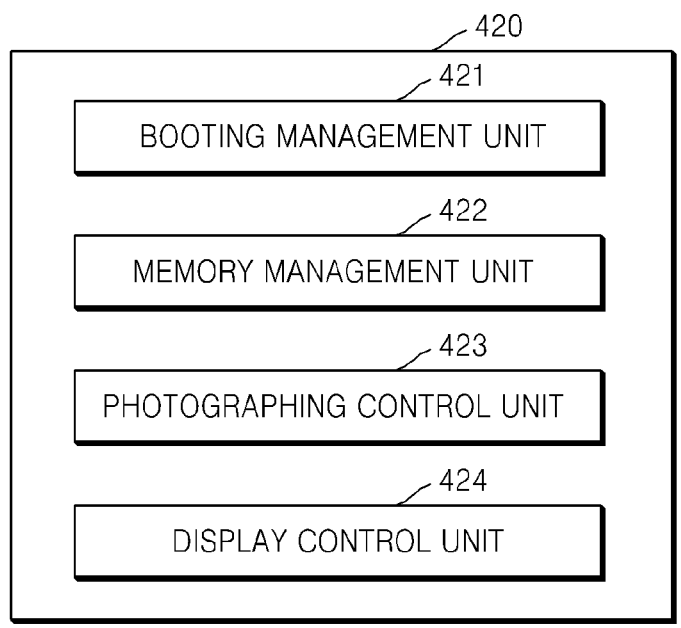
FIG. 5 is a block diagram illustrating an image processor illustrated in FIG. 4.

FIG. 5 is a block diagram illustrating the image processor 420 illustrated in FIG. 4.

Referring to FIG. 5, the image processor 420 includes a booting management unit 421, a memory management unit 422, a photographing control unit 423, and a display control unit 424. If the image processor 420 is completely booted up, the image processor 420 determines whether the main processor 410 is completely booted up. In general, a booting time of the image processor 420 is about 1 to 2 seconds, and a booting time of the main processor 410, for example, an application processor, is about 10 seconds. Accordingly, if a photographing key value (e.g., a shutter release signal) is input, the image processor 420 is completely booted up first, and then monitors whether the main processor 410 is completely booted up. Here, although the image processor 420 determines whether the main processor 410 is completely booted up, the determination is not limited thereto, and the main processor 410 may inform the image processor 420 of whether the main processor 410 is being booted up or has completely booted up.

If the booting management unit 421 determines that the main processor 410 is not completely booted up, the memory management unit 422 determines whether a storage space of the first storage 450 connected to the image processor 420 is sufficient. Whether the storage space is sufficient is determined by comparing a memory size of the first storage 450 to a threshold value determined by taking into consideration a data size generally required for a photographing operation. That is, it is determined whether the size of the storage space is equal to or greater than the threshold value. Also, the memory management unit 422 manages the first storage 450 to store captured images. Also, the memory management unit 422 sequentially transmits images captured or compressed before the main processor 410 is completely booted up, and stored in the first storage 450, to the main processor 410. For example, the booting management unit 421 continuously monitors whether the main processor 410 is completely booted up, and the memory management unit 422 transmits the captured images stored in the first storage 450 to the main processor 410, if the main processor 410 is completely booted up.

If the memory management unit 422 determines that the storage space of the first storage 450 is sufficient, the photographing control unit 423 controls a photographing operation to be performed.

The display control unit 424 controls a live-view image input via the photographing module 440, images captured via the photographing module 440, or captured images stored in the first storage 450, to be displayed on the display unit 480. Also, the display control unit 424 outputs a selection control signal for controlling the selection of data provided from the image processor 420 (a live-view or captured image), to the selection unit 470.

Figure 6:
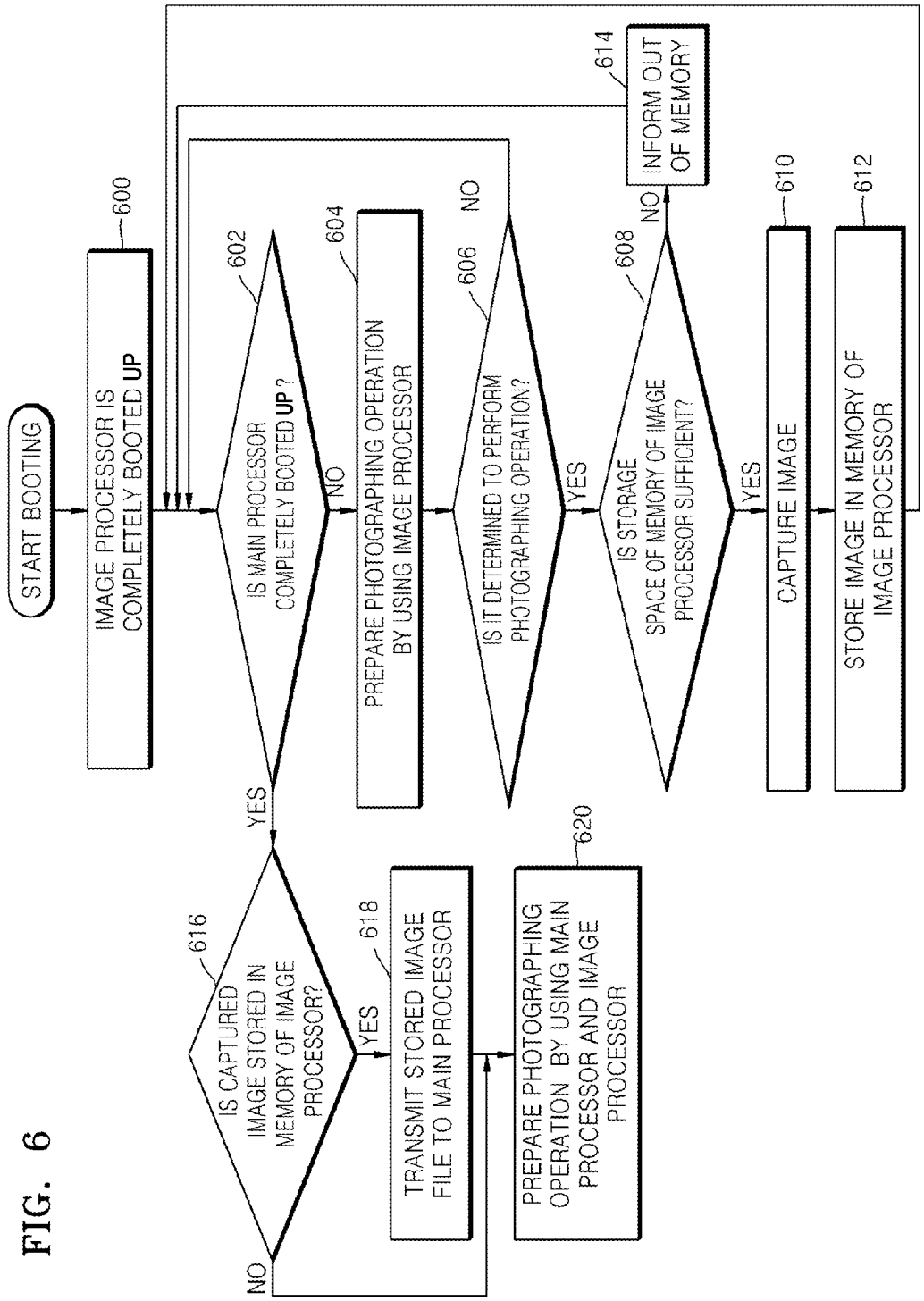
FIG. 6 is a flowchart illustrating a method of controlling an electronic apparatus, according to an embodiment.

FIG. 6 is a flowchart illustrating a method of controlling an electronic apparatus (e.g., a photographing apparatus), according to an embodiment.

Referring to FIG. 6, when the photographing apparatus starts to be booted up, in operation 600, an image processor is completely booted up. Here, the booting up may be booting up due to power on, but is not limited thereto. Also, in a photographing apparatus having a 2-chip structure including a main processor and an image processor, a booting time of the image processor may be about 1 to 2 seconds, and a booting time of the main processor may be about 10 seconds.

In operation 602, it is determined whether a main processor is completely booted up. If the main processor is not completely booted up, in operation 604, a photographing operation is prepared by using the image processor.

In operation 606, it is determined whether to perform a photographing operation. For example, it is determined whether a user has pressed a shutter release button, where a shutter release signal is received by the image processor. Here, although the operation of determining whether the shutter release signal is received is performed between operations 604 and 608, the above operation is not limited thereto, and may be performed before operation 600, or between operations 600 and 602. If it is determined not to perform a photographing operation in operation 606, the method returns to operation 602 and it is determined again whether the main processor is completely booted up.

Otherwise, if it is determined to perform a photographing operation in operation 606, (i.e., if the shutter release signal is received), then in operation 608, it is determined whether a storage space of a memory of the image processor is sufficient.

If the storage space of the memory of the image processor is determined to be sufficient in operation 608, (i.e., if it is enabled to capture and store images), images are captured in operation 610, and are stored in the memory of the image processor in operation 612. Then, the method returns to operation 602 and it is determined again whether the main processor is completely booted up.

If a sufficient time has passed, that is, if the main processor is completely booted up, in operation 616, it is determined whether the captured images are stored in the memory of the image processor. That is, it is determined whether the images captured in operations 604 to 612 are stored in the memory of the image processor. If it is determined that the captured images are stored in the memory of the image processor in operation 616, then in operation 618, the stored captured images are transmitted to the main processor. The main processor receives and stores the transmitted captured images in a memory of the main processor, for example, an embedded memory or an external memory. Although not shown in FIG. 6, if the main processor is completely booted up, the main processor may immediately execute programs related to a photographing operation, and a next photographing operation may be prepared by the control of the main processor.

In operation 620, a photographing operation is prepared by using the main processor and the image processor.

Otherwise, if the storage space of the memory of the image processor is determined to not be sufficient in operation 608, (i.e., if it is not enabled to capture and store images), the photographing apparatus is informed that the memory of the image process is out of storage space in operation 614, and the method returns to operation 602. Here, although operations 608 and 614 are performed, in other embodiments, operation 614, or operations 608 and 614 may not be performed and may be omitted.

According to an embodiment, if a user desires to take a photo by using a photographing apparatus at a desired moment or a very short moment, a photographing operation may be performed to obtain a desired photo without waiting until a main processor is completely booted up after an image processor is completely booted up.

As described above, according to one or more of the above embodiments, a photographing operation may be rapidly performed before a main processor is completely booted up.

The device described herein may comprise a processor, a memory for storing program data and executing it, a permanent storage such as a disk drive, a communications port for handling communications with external devices, and user interface devices, including a touch panel, keys, buttons, etc. When software modules or algorithms are involved, these software modules may be stored as program instructions or computer-readable codes executable on the processor on a computer-readable medium. Examples of the computer-readable recording medium include magnetic storage media (e.g., ROM, floppy disks, hard disks, etc.), and optical recording media (e.g., CD-ROMs or DVDs). The computer-readable recording medium can also be distributed over network-coupled computer systems so that the computer-readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the exemplary embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The embodiments may be described in terms of functional block components and various processing steps. Such functional blocks may be realized by any number of hardware and/or software components configured to perform the specified functions. For example, may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements the invention may be implemented with any programming or scripting language such as C, C++, Java, assembly language, or the like, with the various algorithms being implemented with any combination of data structures, objects, processes, routines or other programming elements. Functional aspects may be implemented in algorithms that execute on one or more processors. Furthermore, the embodiments could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The embodiments are not limited to the described order of the steps. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in the art without departing from the spirit and scope of the embodiments.

What is claimed is:

1. A method of controlling an electronic apparatus comprising a main processor and an image processor, the method comprising:
   when the image processor is completely booted up, determining whether the main processor is completely booted up;
   when the main processor is not completely booted up, capturing an image by controlling a photographing operation of the electronic apparatus, by the image processor, in response to a shutter release signal;
   storing the captured image according to the photographing operation, in a memory of the image processor, and
   when the main processor is completely booted up, transmitting the captured image stored in the memory of the image processor to the main processor.

2. The method of claim 1, wherein, if the main processor is completely booted up, controlling, by the main processor, the image processor to control the photographing operation.

3. The method of claim 1, further comprising:
   compressing the captured image; and
   transmitting, by the image processor, the compressed image to the main processor.

4. The method of claim 3, further comprising:
   receiving, by the main processor, the transmitted compressed image;
   generating, by the main processor, a compressed image file; and
   storing, by the main processor, the compressed image file in a memory of the main processor or an external memory.

5. The method of claim 1, wherein, if the main processor is completely booted up, executing, by the main processor, a program for the photographing operation.

6. The method of claim 1, wherein the controlling of the photographing operation comprises:
   displaying a live-view image and a setting menu;
   setting a photographing control parameter of an input image in response to the shutter release signal;
   capturing the input image according to the set photographing control parameter; and
   displaying the captured image.

7. The method of claim 1, further comprising:
selecting one of a first image output from the image processor and a second image output from the main processor; and
displaying the selected image.

8. The method of claim 7, wherein the image is selected according to a selection control signal of the image processor or a selection control signal of the main processor.

9. The method of claim 1, further comprising:
determining whether a size of a storage space of the memory is equal to or greater than a threshold value,
wherein, if the size of the storage space of the memory is equal to or greater than the threshold value, controlling, by the image processor, the photographing operation of the electronic apparatus.

10. The method of claim 9, further comprising:
if the size of the storage space of the memory is less than the threshold value, outputting a message informing that the memory is out of storage space.

11. The method of claim 1, wherein the main processor is an application processor.

12. A non-transitory computer-readable recording medium having recorded thereon a computer program for executing the method of claim 1.

13. An electronic apparatus comprising:
a main processor;
a first memory connected to the main processor;
an image processor that controls a photographing operation in response to a control signal from the main processor; and
a second memory connected to the image processor,
wherein, when the main processor is not completely booted up after the image processor is completely booted up, the image processor captures an image by controlling the photographing operation in response to a shutter release signal, and stores the captured image according to the photographing operation in the second memory,
wherein, when the main processor is completely booted up, the image processor transmits the captured image stored in the second memory to the main processor.

14. The electronic apparatus of claim 13, wherein the image processor comprises:
a booting management unit that, if the image processor is completely booted up, determines whether the main processor is completely booted up;
a photographing control unit that, if the main processor is not completely booted up, controls the photographing operation of the electronic apparatus in response to the shutter release signal; and
a memory management unit that stores the image captured according to the photographing operation in the second memory.

15. The electronic apparatus of claim 14, wherein:
the memory management unit determines whether a size of a storage space of the second memory is equal to or greater than a threshold value; and
if the size of the storage space of the memory is equal to or greater than the threshold value, the photographing control unit controls the photographing operation.

16. The electronic apparatus of claim 13, further comprising:
a selection unit that selects one of a first image output from the image processor and a second image output from the main processor; and
a display unit that displays the image selected by the selection unit.

17. The electronic apparatus of claim 16, wherein the selection unit selects the image according to a selection control signal of the image processor or a selection control signal of the main processor.

18. The electronic apparatus of claim 13, wherein, if the main processor is completely booted up, the main processor controls the image processor to control the photographing operation.

19. The electronic apparatus of claim 13, wherein, if the main processor is completely booted up, the main processor executes a program for the photographing operation.

20. The electronic apparatus of claim 13, wherein the main processor is an application processor.

* * * * *